United States Patent [19]

Mieville

[11] 4,171,290

[45] Oct. 16, 1979

[54] CATALYST FOR SELECTIVE HYDROCRACKING OF ALKYLBENZENES

[75] Inventor: Rodney L. Mieville, Glen Ellyn, Ill.

[73] Assignee: Standard Oil Company (Indiana), Chicago, Ill.

[21] Appl. No.: 899,313

[22] Filed: Apr. 24, 1978

[51] Int. Cl.$^2$ .................... B01J 21/04; B01J 23/60
[52] U.S. Cl. ..................................... 252/466 PT
[58] Field of Search .............. 252/466 PT; 260/672 R

[56] References Cited

U.S. PATENT DOCUMENTS

| | | | |
|---|---|---|---|
| 3,306,944 | 2/1967 | Pollitzer | 260/672 R |
| 3,875,253 | 4/1975 | Huang | 252/466 PT |
| 3,992,468 | 11/1976 | Cosyns et al. | 260/672 R |

*Primary Examiner*—W. J. Shine
*Attorney, Agent, or Firm*—William C. Clarke; Arthur G. Gilkes; William T. McClain

[57] ABSTRACT

Catalyst composition comprising highly purified alumina containing essentially no silica with a surface area of at least 100 m$^2$/g and up to 5% rhodium and up to 10% zinc.

4 Claims, No Drawings

CATALYST FOR SELECTIVE HYDROCRACKING OF ALKYLBENZENES

BACKGROUND OF THE INVENTION

This invention relates to a catalyst useful for the selective hydrocracking of fractionated heavy reformate containing alkyl aromatics into more useful compounds. More specifically, this invention is concerned with a catalyst for a selective hydrocracking or scission process whereby a fractionated heavy reformate stream comprising alkylbenzenes having substituted thereon methyl, ethyl, isopropyl and butyl radicals is converted primarily to methyl-substituted benzenes and formation of benzene is minimized utilizing a catalyst comprising highly purified gamma or eta alumina containing essentially no silica, a surface area of at least 100 m$^2$/g, and rhodium and zinc. Fractionated heavy reformates can be reformates from which C$_7$ aromatics and lighter components have been largely removed. This stream typically can contain C$_8$–C$_{10}$ aromatics consisting of xylenes, ethylbenzene, isopropyl benzene, butyl benzene and dimethyl ethyl benzene. Alkyl scission of the alkylbenzenes having substituted thereon alkyl radicals of 1 to 4 carbon atoms in this fraction to methyl substituted benzenes would provide an aromatic stream which is ideally suited for preparing xylenes via transalkylation.

In the prior art, methods which have been used to produce aromatic chemicals from fractionated heavy reformates utilize a hydrocracking and/or a hydrodealkylation step to convert the C$_9$ and C$_{10}$+ aromatic components to benzene, toluene and C$_8$ aromatics. The C$_6$+ paraffins are converted into readily distillable low boiling hydrocarbons of C$_5$ and lighter. Processes utilizing these principles are described in U.S. Pat. Nos. 3,957,621 and 3,862,254.

Other typical prior art on hydrodealkylation of alkyl aromatics is the following:

U.S. Pat. No. 2,422,673 teaches hydrodealkylation or demethylation of an alkyl aromatic using a catalyst containing nickel or cobalt on diatomaceous earth. Temperatures used in the process are between 350°–650° F. and pressures are between subatmospheric to 1000 psig. The reaction is carried out at a low pressure of hydrogen so as to obtain a high proportion of demethylation and a relatively small amount of hydrogenation of aromatic hydrocarbons to naphthenic hydrocarbons.

U.S. Pat. No. 2,734,929 teaches hydrodealkylation of alkyl aromatics. Ethylbenzene is hydrocracked to principally benzene and xylene to toluene. The catalyst contains a Group VIB or Group VIII metal hydrogenation component such as chromium, molybdenum, tungsten, iron, cobalt, ruthenium, rhodium, etc. The catalyst is preferably suspended on a carrier which has no adverse effect on the reaction. Gel alumina, which contains silica and which usually has a surface area of over 100 m$^2$/g, as measured by gas adsorption, is preferred. The process requires a gaseous diluent which, column 2, lines 16–18, is stated as being a critical feature of the invention. Operating conditions include a temperature between 800°–1500° F. and a pressure of 0–5000 psig.

U.S. Pat. No. 3,478,120 discloses a process for hydrodealkylation of ethylbenzene to toluene, benzene, methane and ethane with the hydrodealkylation being carried out in the presence of xylenes. The catalyst used comprises an iron group metal on calcium aluminate. Operating conditions include a temperature range of 500°–1200° F. and pressure from atmospheric to 2000 psig.

U.S. Pat. No. 3,306,944 teaches catalytic hydrodealkylation of alkyl aromatic hydrocarbons. Examples are cumene to ethylbenzene (predominantly) and toluene; p-t-butyltoluene to p-propyltoluene, p-ethyltoluene and xylene. The catalyst comprises a metal selected from the group consisting of rhodium, ruthenium, etc. upon a promoted metal oxide support. "Promoted" refers to pretreatment of the support with a salt or hydroxide of an alkali metal or alkaline earth metal. The preferred metal oxide support is gamma alumina which has a surface area ranging from 100 to about 300 m$^2$/g and is freed from combined or adsorbed water.

U.S. Pat. No. 3,992,468 teaches a catalytic hydrodealkylation process of alkyl aromatic hydrocarbons to benzene. The catalyst comprises at least two metals, one selected from the group consisting of ruthenium, cobalt, osmium, palladium, rhodium, iridium, platinum, chromium, molybdenum, tungsten and manganese, the other selected from, among others, zinc, cadmium, and gallium, the final catalyst having a specific surface area of from 1 to 100 m$^2$/g. The carrier is of low acidity and can be alumina, including gamma alumina, magnesia, magnesia-silica, acidic alumina, alumina-silica, among others, including molecular sieves.

U.S. Pat. No. 3,975,454 teaches a catalytic hydrodealkylation process of alkyl aromatic hydrocarbons at a temperature within the range of 250°–400° C. The catalyst comprises the compounds formed from either graphite and an alkali metal, or graphite, an alkali metal and a compound of a metal selected from the group consisting of Group VIII of the Periodic Table which includes iron, nickel, cobalt, etc. Surface area of the catalyst of Example I was cited as about 20 m$^2$/g.

Accordingly, the prior art teaches catalytic hydrocracking and/or hydrodealkylation of alkyl aromatic hydrocarbons. However, the catalytic selective hydrocracking or alkyl scission of alkyl aromatic hydrocarbons is not taught wherein the hydrocarbon stream comprises C$_8$–C$_{10}$ aromatic hydrocarbons and the catalyst used comprises high-surface area, highly purified gamma or eta alumina containing essentially no silica, with a surface area greater than 100 m$^2$/g, and rhodium and zinc under process conditions which selectively scission alkylbenzenes to predominantly methyl-substituted benzenes.

SUMMARY OF THE INVENTION

Catalyst composition comprising highly purified alumina containing essentially no silica and with a surface area of at least 100 m$^2$/g and up to 5 (wt) % rhodium and up to 10 (wt) % zinc.

DETAILED DESCRIPTION OF THE INVENTION

The catalyst of this invention is useful for selective hydrocracking/scission of alkyl groups of aromatic petroleum hydrocarbons. Particularly, it is a catalyst for selective scission of alkylbenzene hydrocarbons wherein the carbon-to-carbon bond of the alkyl group is cleaved. Ethylbenzene is cleaved to produce a toluene-rich stream which is typically a desirable feed for a transalkylation unit.

Typical feedstocks which can be selectively scissioned are petroleum hydrocarbon streams which comprise single-ring aromatic hydrocarbons which boil below about 350° F. and contain 8-10 carbon atoms. Such aromatic hydrocarbon streams can be petroleum hydrocarbon fractions derived from petroleum reformate and which are known as heavy reformate. For purposes of this invention, the term "heavy reformate" is defined as the heavy fraction obtained from a catalytic reformer with a boiling point range of 220° F. to 430° F. comprising $C_8$-$C_{10}$ aromatics and heavier components. Fractionated heavy reformate is defined as that fraction of heavy reformate from which the components heavier than $C_{10}$ have been largely removed, leaving typically only $C_8$-$C_{10}$ aromatics. Accordingly the fractionated heavy reformate can comprise ethylbenzene, xylenes, isopropylbenzene, ethyl toluene, dimethyl ethyl benzene, trimethylbenzenes and butylbenzene.

Typically the feedstock is mixed with hyrogen or a hydrogen-containing gas and preheated to a suitable temperature, and then transferred to the selective hydrocracking or scission demethylation reaction zone, which may contain one or more reactors. Advantageously, the feed is substantially completely vaporized before being introduced into the reaction zone.

The feedstock is contacted in the reaction zone with the hereinafter described catalyst in the presence of hydrogen or a hydrogen-affording gas. Advantageously, a hydrogen-to-hydrocarbon mole ratio of at least 4:1 is employed, and the hydrogen-to-hydrocarbon mole ratio can range up to 200:1. Preferably, the hydrogen-to-hydrocarbon mole ratio can range between 5:1 to about 9:1 at pressures of 150 to 250 psig respectively. Contact time can range from 0.01 to 20 seconds, preferably no greater than 10 seconds. Contact time is defined as bulk volume of the catalyst divided by volumetric flow rate of reactants and hydrogen. Other operating conditions comprise an elevated temperature of about 600° F. to about 1000° F., preferably about 800° F. to about 950° F.; an elevated pressure of about 100 psig to about 500 psig, preferably about 170 psig to about 250 psig; and WHSV of about 0.1 to about 20 weights of hydrocarbon per hour per weight of catalyst, preferably about 1 to about 10 weights of hydrocarbon per hour per weight of catalyst.

The catalytic composition of this invention comprises a selective hydrocracking or scission composition comprising an inorganic oxide, rhodium and zinc. Rhodium is present in an amount within the range of about 0.1 to about 5 weight percent, expressed as the reduced metal and based upon the weight of the catalytic composition. Zinc is present in an amount within the range of about 0.1 to about 10 weight percent, expressed as the reduced metal and based upon the weight of the catalytic composition. The presence of zinc is essential to control hydrocracking of the aromatic ring and to selectively scission alkylbenzenes to predominantly methyl-substituted benzenes.

It is essential that the porous refractory inorganic oxide that is employed in the catalytic composition of the present invention is a highly purified high surface area gamma or eta alumina containing essentially no silica and with a surface area of at least 100 m$^2$/g. Catalyst supports which promote non-selective hydrocracking activity such as silica-alumina, gallium oxide-alumina and the like are not suitable. Catalytically active alumina, such as gamma-alumina and eta-alumina, is the preferred refractory inorganic oxide. Such alumina should have a pore diameter of about 70 Angstroms to about 200 Angstroms and a surface area of at least 100 square meters per gram. Suitably, the surface area should be within the range of about 100 square meters per gram to about 500 square meters per gram.

The preferred alumina which is utilized in the present invention is relatively free or substantially free from water. It is also essential that the alumina have a high surface area, of at least 100 m$^2$/g or more, measured by surface adsorption techniques. Gamma alumina accordingly is preferred as it has a surface area ranging from about 100 to about 300 square meters/gram. Alpha is not suitable as it has a surface area ranging from about 10 to 25 square meters per gram. In addition, aluminas which contain combined water but which have relatively high surface areas are also unsatisfactory supports. Such aluminas include dried alumina monohydrates which have not been sufficiently calcined to remove the combined or adsorbed water.

An example of the refractory inorganic oxide component that is employed in the catalyst of this invention is PHF or Aero-1000 alumina manufactured by American Cyanamid Corp. It is described as a high purity gamma alumina, the inspection data being: surface area 206 m$^2$/g, pore volume 0.6 cc/g, average pore diameter 90 Å (Angstroms), sodium content 0.1 wt.%, silicon content 0.02 wt.%, iron content 0.025 wt.%.

While it is not desired to be bound by anything concerning the reaction mechanism of the selective hydrocracking or alkyl scissioning composition of this invention, it is theorized that the catalytic alkyl scission of the alkylbenzene reaction is structure sensitive; that the degree of dispersion of the metal catalyst particles in the highly purified alumina support is extremely high and that accordingly the alkyl scission reaction which occurs with alkylbenzenes is sensitive to the state of the dispersion of the metal per unit surface area of the support. It is theorized that the highly purified alumina containing essentially no silica is essential to the success of the process in that the presence of silica promotes nonselective hydrocracking and ring scission. It is also theorized that the use of alumina and the particular metals, rhodium in conjunction with zinc, impose the particular catalytic activity which is desired; namely the selective scission to methyl-substituted benzenes of alkylbenzenes, by means of the particular surface properties imposed upon the catalyst composition by this specific composition comprising this alumina and these metals.

The catalyst composition of the present invention can be prepared in various ways. For example, the apppropriate aqueous salt material in the form of a chloride or nitrate solution is stirred into a sol or gel of the refractory inorganic oxide, followed by the cogelling of the sol or gel mixture by the addition of dilute ammonia. The resulting cogelled material is then dried and calcined to remove the combined or adsorbed water. As an alternate method of preparation, the dried alumina is impregnated with a solution of soluble rhodium compound, dried and then re-impregnated with a zinc solution. The impregnated alumina is then dried, pelleted, and calcined. Suitable drying conditions for use in the above described methods comprise a temperature in the range of about 200° F. to about 400° F. and a drying time of about 5 to 30 hours. Suitable calcination conditions comprise a temperature in the range of about 900° to 1400° F. and a calcination time of about 2 to about 20 hours. Preferred drying and calcination conditions are a temperature of about 250° F. for about 16 hours and a temperature of about 1000° F. for about 6 hours, respectively.

Catalysts were tested at atmospheric pressure and at elevated pressures. The tests were made in a reactor which consisted of ¼ inch stainless steel tube, 18 inches long. Heat was supplied by a tubular electric furnace. The external reactor temperature was measured by thermocouples attached to the exterior of the reactor tube. The thermocouples were positioned at the center of the catalyst bed. The hydrocarbon feed was introduced at room temperature by a bubbler system. Hydrogen was metered by needle valve and rotameter into the hydrocarbon wherein a constant vapor pressure was developed. The gaseous products were analyzed by gas chromatography.

The invention comprises a catalyst for the selective hydrocracking or alkyl scission of alkylbenzenes which consists essentially of contacting an alkyl aromatic stream in a reaction zone under scission conditions and in the presence of a catalyst to furnish a product containing predominantly methyl-substituted benzenes, said catalyst comprising highly purified alumina containing essentially no silica, with a surface area of at least 100 m$^2$/g, and rhodium and zinc, said alumina being selected from the group consisting of catalytically active gamma alumina or eta-alumina, said rhodium and zinc selected from the group consisting of the reduced metals, the oxides and mixtures thereof.

Embodiments of the present invention can be found in the following examples. These embodiments and examples are presented for purposes of illustration only and are not intended to limit the scope of the invention.

Preliminary Screening

A series of single metal-on-carrier catalysts were screened for alkyl scission activity using ethylbenzene of 99.6% purity as a feedstock. The metals were platinum, nickel, rhodium, iridium and ruthenium. Each catalyst comprised a composition of a metal in a weight percent ranging from 0.2 to 1.0% and either silica or alumina. The silica was Davison No. 59 silica gel (Davison Chemical Division, W. R. Grace and Company, Baltimore, Md.). The alumina was PHF or Aero-1000 gamma alumina (Industrial Chemicals Div., American Cyanamid Corp., Linden, N.J.). The screening was carried out under hydrogen at atmospheric pressure at 60 psig at temperatures of 450° C. and 500° C. and WHSV of 0.12 and 0.65 weights of hydrocarbon per hour per weight of catalyst.

The catalysts were prepared by impregnating the silica gel or gamma alumina with the aqueous metal salt solution. The impregnated silica gel and aluminas were dried at 120° C. in a vacuum oven and then calcined at 550° C. in hydrogen for one hour. A typical preparation of 0.5 (wt) % rhodium-alumina was as follows:

10 g 20/40 Aero-1000 alumina was impregnated with 10 ml. of a rhodium solution of a 0.5 (wt) % aqueous solution of rhodium. The sample was dried for 2 hours at 120° C. and calcined for one hour at 550° C. under hydrogen.

Catalyst loadings of 0.25 g were used. Catalysts F and G prior to calcination were sulfated with 10 ml solution of 0.1% H$_2$SO$_4$. Conventional platinum catalysts A and B were used as controls.

The catalysts prepared were as follows:

| | |
|---|---|
| Catalyst A (control) | 0.5 (wt) % Pt on SiO$_2$ |
| Catalyst B (control) | 0.45 (wt) % Pt on Al$_2$O$_3$ |
| Catalyst C | 1.0 (wt) % Ni on SiO$_2$ |
| Catalyst D | 0.2 (wt) % Ni on Al$_2$O$_3$ |
| Catalyst E | 0.5 (wt) % Rh on SiO$_2$ |
| Catalyst F | 0.5 (wt) % Rh on SiO$_2$/0.1 (wt) % SO$_4$ |
| Catalyst G | 0.5 (wt) % Rh on Al$_2$O$_3$/0.2 (wt) % SO$_4$ |
| Catalyst H | 0.3 (wt) % Ir on SiO$_2$ |
| Catalyst I | 0.5 (wt) % Ru on SiO$_2$ |

Details of the results using Catalysts A-I are in the following Table I.

Table I

Ethyl Scission of Ethylbenzene Yields in Mole Percent

| | | Atmospheric Pressure WHSV 0.65 | | | | 60 psig WHSV 0.12 | | | |
|---|---|---|---|---|---|---|---|---|---|
| Catalyst | Temp. °C. | Benzene | Toluene | Cracked | Ratio Toluene/ Benzene | Benzene | Toluene | Cracked | Ratio Toluene/ Benzene |
| A | 450 | 4.6 | 14.5 | — | 3.2 | 7.5 | 14.5 | 3.0 | 1.9 |
| B | 450 | 4.6 | 14.5 | — | 3.2 | 7.5 | 14.5 | 3.0 | 1.9 |
| C | 450 | 2.3 | 4.8 | — | 2.1 | 11.9 | 55.8 | 21.0 | 4.7 |
| D | 450 | 3.1 | 2.0 | — | 0.6 | 9.7 | 54.2 | 6.1 | 5.6 |
| D | 500 | — | — | — | — | 42.3 | 18.1 | 27.0 | 0.4 |
| E | 450 | — | — | 100 | — | — | — | — | — |
| F[a] | 450 | 11.7 | 39.0 | 7 | 3.3 | 20.6 | 27.2 | 49.5 | 1.3 |
| G[a] | 450 | 26.9 | 26.6 | 7.5 | 1.0 | — | — | 94 | — |
| H | 450 | — | — | 100 | — | — | — | — | — |
| I | 450 | — | — | 100 | — | — | — | — | — |

[a]Sulfated
Note: Contact time: 0.25 seconds

The increase in pressure from atmospheric to 60 psig increased non-selective hydrocracking both at the ethyl group-ring bond and within the ring itself. The lower pressure favored the scission reaction of methyl scission from the ethyl group. Higher temperature favored the non-selective hydrocracking reaction. No significant difference occured in the selectivity between silica and alumina supported catalysts, but activity was generally higher with alumina. The nickel catalysts, C and D, showed a small advantage at the higher pressure over the conventional platinum catalysts, A and B, used as controls.

EXAMPLE I

In the method of the preliminary screening example, catalysts J, K and L were run under the same conditions. Catalyst J was presulfated with a dilute solution of 0.1% H$_2$SO$_4$ after drying. The ethylbenzene feed was 99.6% pure. Catalyst J, a conventional reforming platinum-rhenium catalyst was used as a control. The composition of the catalysts were:

| | |
|---|---|
| Catalyst J (control) | 0.35 (wt) % Pt-0.35 (wt) % Re on Al₂O₃/0.3 (wt) % SO₄ |
| Catalyst K | 0.5 (wt) % Rh-3.0 (wt) % Zn on SiO₂ |
| Catalyst L | 0.5 (wt) % Rh-3.0 (wt) % Zn on Al₂O₃ |

The results are in Table II.

Table II

| | | Rh-Zn Catalytic Ethyl Scission of Ethylbenzene Yields in Mole Percent | | | | | | | |
|---|---|---|---|---|---|---|---|---|---|
| | | Atmospheric Pressure WHSV 0.65 | | | | 60 psig WHSV 0.12 | | | |
| Catalyst | Temp. °C. | Benzene | Toluene | Cracked | Ratio Toluene/ Benzene | Benzene | Toluene | Cracked | Ratio Toluene/ Benzene |
| J$^{(a)}$ | 450 | 1.9 | 5.2 | — | 3.6 | 5.3 | 18.0 | 15.5 | 3.4 |
| J$^{(a)}$ | 500 | — | — | — | — | 17.2 | 38.0 | 11.5 | 2.2 |
| K | 500 | — | — | — | — | — | — | 15.0 | — |
| L | 450 | 1.8 | 39.1 | 4.8 | 21.7 | 2.2 | 26.9 | 9.7 | 12.2 |
| L | 500 | — | — | — | — | 9.7 | 56.4 | 10.0 | 5.8 |

$^{(a)}$Sulfated
Note: Contact time 0.25 seconds

The rhodium-zinc on alumina showed an unusually high activity for the production of toluene from an ethylbenzene feed. All others showed lower activity or selectivity. As shown in Tables I and II, catalysts containing iridium, rhodium and ruthenium on silica hydrocracked extensively unless controlled by sulfating or by additions of zinc. In comparison with the conventional platinum-rhenium catalyst, J, used as control in Example I, the rhodium-zinc on alumina catalyst showed a large superiority under all conditions.

What is claimed is:

1. A catalyst composition comprising highly purified alumina containing essentially no silica with a surface area of at least 100 m²/g, up to 5 wt. percent rhodium zinc oxide wherein, up to 10 wt. percent zinc is present, expressed as the metal, and wherein the said alumina comprises at least one member selected from the group consisting of gamma alumina and eta alumina.

2. The catalyst composition of claim 1 wherein the said rhodium is present in an amount within the range of from about 0.1 to 5 wt. percent, based upon the weight of said catalyst composition and said zinc oxide is present in an amount within the range of from about 0.1 to 10 wt. percent expressed as the metal and based upon the weight of said composition.

3. The catalyst composition of claim 1 wherein the said alumina is gamma alumina.

4. The catalyst composition of claim 1 wherein the said rhodium is selected from the group consisting of the metal, the oxide and mixtures thereof.

* * * * *

UNITED STATES PATENT OFFICE
CERTIFICATE OF CORRECTION

Patent No. 4,171,290   Dated October 16, 1979

Inventor(s) Rodney L. Mieville

It is certified that error appears in the above-identified patent and that said Letters Patent are hereby corrected as shown below:

| Patent Column | Line | |
|---|---|---|
| 3 | 18 | "hyrogen" should be --hydrogen-- |
| 6 | 34 | "Male Percent" should be --Mole Percent-- (Table I, heading) |
| 6 | 42 | "94 -" should be --94-- (- belongs in far right column of table) |
| 8 | 4 | "rhodium" should be --rhodium,-- |
| 8 | 5 | "wherein, up" should be --wherein up-- |

Signed and Sealed this

Twenty-ninth Day of July 1980

[SEAL]

Attest:

SIDNEY A. DIAMOND

Attesting Officer   Commissioner of Patents and Trademarks